March 7, 1944. W. LEATHERS ET AL 2,343,463
INDICATING CONTROL APPARATUS FOR PERFORATING MACHINES
Filed Sept. 3, 1943 3 Sheets-Sheet 1

INVENTOR:
Ward Leathers,
William J. A. Bailey.
BY *W. M. Wilson* ATTORNEY

March 7, 1944. W. LEATHERS ET AL 2,343,463
INDICATING CONTROL APPARATUS FOR PERFORATING MACHINES
Filed Sept. 3, 1943   3 Sheets-Sheet 2

INVENTOR:
Ward Leathers,
William J. A. Bailey.
BY W. M. Wilson ATTORNEY

Patented Mar. 7, 1944

2,343,463

UNITED STATES PATENT OFFICE 2,343,463

INDICATING CONTROL APPARATUS FOR PERFORATING MACHINES

Ward Leathers, Brooklyn, N. Y., and William J. A. Bailey, Packanack Lake, N. J., assignors to International Business Machines Corporation, New York, N. Y., a corporation of New York Application September 3, 1943, Serial No. 501,124

12 Claims. (Cl. 164—113)

The present invention relates to control apparatus for perforating machines and more particularly to a flexible electrically controlled device which may be preset to cause duplicating, punching and spacing operations by a tape perforating apparatus.

The apparatus comprising the present invention is primarily designed for use as a control unit for operating a token or card making machine of the type shown and described in a copending application of Ward Leathers, Serial No. 499,352, filed August 20, 1943, for Card forming and perforating apparatus, wherein a strip of tape is perforated progressively and perforated portions of the tape are severed periodically from a roll of the tape to produce small perforated cards or tokens. The invention, however, is susceptible to modification and the same may be employed as a control unit for the operation of all manner of perforating apparatus whether the same be utilized solely for duplication operations, for original perforating operations, for verifying operations or for card perforating and forming operations. The control apparatus is not necessarily limited to use in the control of perforating apparatus, however, and the same may be employed for controlling the operation of a great variety of recording apparatus regardless of the manner in which actual recording takes place.

It is among the principal objects of the present invention to provide a control apparatus of the type set forth above which operates under the control of a keyboard and which is provided with means whereby the operator may at all times be informed of the particular field and index point position within the various fields undergoing perforation with respect to a particular billing data form. and thus be relieved of the necessity of resorting to manual spacing and resetting operations to maintain the data perforated in the final billing data tape in agreement with the record material from which such data is obtained.

Another important object of the invention is to provide a control apparatus of this character which will operate to cause perforation of the billing data tape in desired portions of the various fields and which, at the same time, will operate by a tabular operation to automatically skip those portions of the various fields which it is not desired to perforate or to skip entire fields at the will of the operator, while at the same time the operator is visually appraised of the fields or portions thereof which have so been skipped.

Yet another object of the invention is to provide a control apparatus for card or token forming perforating machines having visual indicating means for informing the operator of the particular field or index point position within a field undergoing perforation which will operate to initiate the necessary card or token severing operations on the billing data tape after perforation of a complete card or token and return the visual indicating means to an initial position indicative of the commencement of the perforation of a new card or token in the first index point position of the first field therein to be perforated.

A further object of the invention is to provide such an apparatus wherein, in the event of a misinterpretation on the part of an operator, and a consequent erroneous perforation of the billing data tape, subsequent perforation of the remaining portions of the particular card or token undergoing perforation may be suspended and by a tabular operation the tape may be advanced through the remaining fields of the card or token and the erroneously perforated token caused to be ejected from the perforating apparatus and the visual indicating means above referred to restored to its initial position preparatory to perforation of a new card or token.

Still another object, in the case where the billing data tape is to be continuously perforated without shearing, is to provide means whereby the control apparatus may be manually preset to effect predetermined spacing operations on the tape to provide unperforated areas between successive unrelated data or accounts, such operations being of a tabular nature.

Other objects and advantages of the invention not at this time enumerated will become apparent as the nature of the invention is better understood.

In the accompanying three sheets of drawings forming part of this specification one embodiment of the invention is shown. In these drawings.

In all of the above described views like characters of reference are employed to designate like parts throughout.

Figure 1:
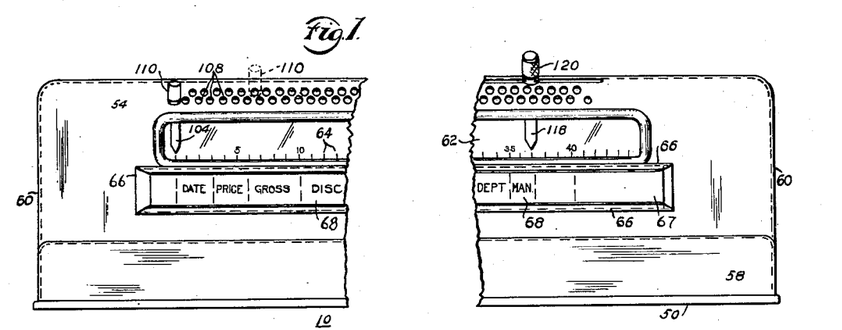
Fig. 1 is a fragmentary, front elevational view of the improved control apparatus comprising the present invention.
Figures 2, 4, 5, 6, 7:
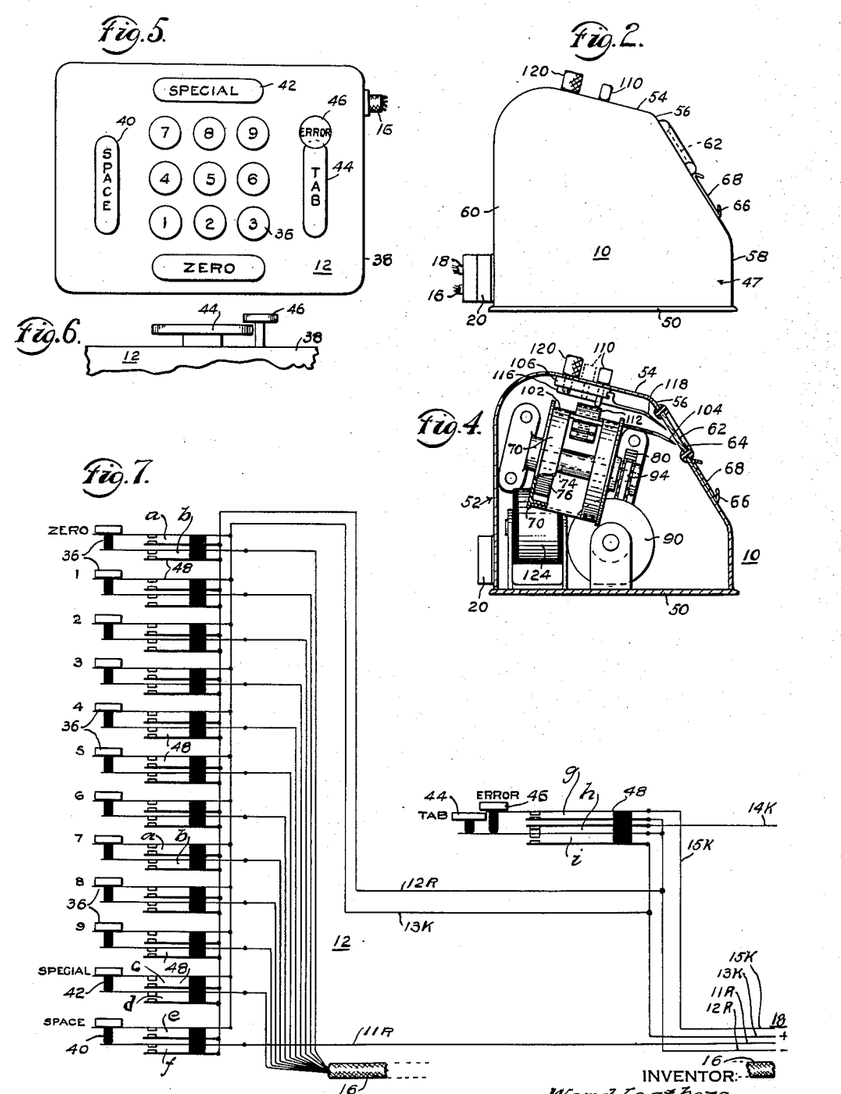
Fig. 2 is a side view thereof.
Fig. 4 is a sectional view taken substantially along the line 4—4 of Fig. 3.
Fig. 5 is a plan view of a keyboard control apparatus employed for manual operation of the indicating control device.
Fig. 6 is a fragmentary detailed view of a mechanically coupled tabular and error key employed in connection with the keyboard control apparatus of Fig. 5.
Fig. 7 is a diagrammatic view of the electrical connections for the keyboard control apparatus of Fig. 5.
Figure 3:
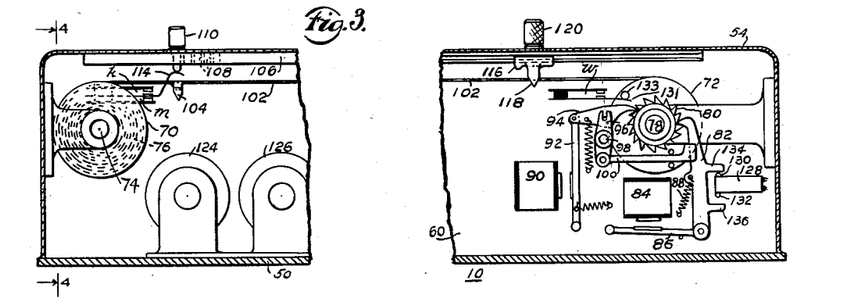
Fig. 3 is a side elevational view similar to Fig. 1, a portion of the machine casing being broken away to more clearly reveal the internal mechanism thereof.

Referring now to Figs. 1 and 2, the indicating control device is designated in its entirety at 10 and is adapted to be actuated under the control of a more or less conventional keyboard 12 (Figs. 5, 6 and 7) for actuation in turn of a recording device in the form of a tape perforating device 14 (Fig. 9), which may be a card or token making apparatus of the type shown and described in the above mentioned copending application of Ward Leathers. For operatively connecting the keyboard 12 to the control device 10, a cable connection 16 is employed, and for operatively connecting the latter device to the perforating device 14 a cable connection 18, comprising wires 11R, 12R, 13R, 14R and 15R, is employed. It will be understood that the various electrical connections between the devices 10, 12 and 14 are detachable, and toward this end conventional Jones type plug-in devices 20 (see Figs. 2 and 4) are preferably employed.

Figure 9:
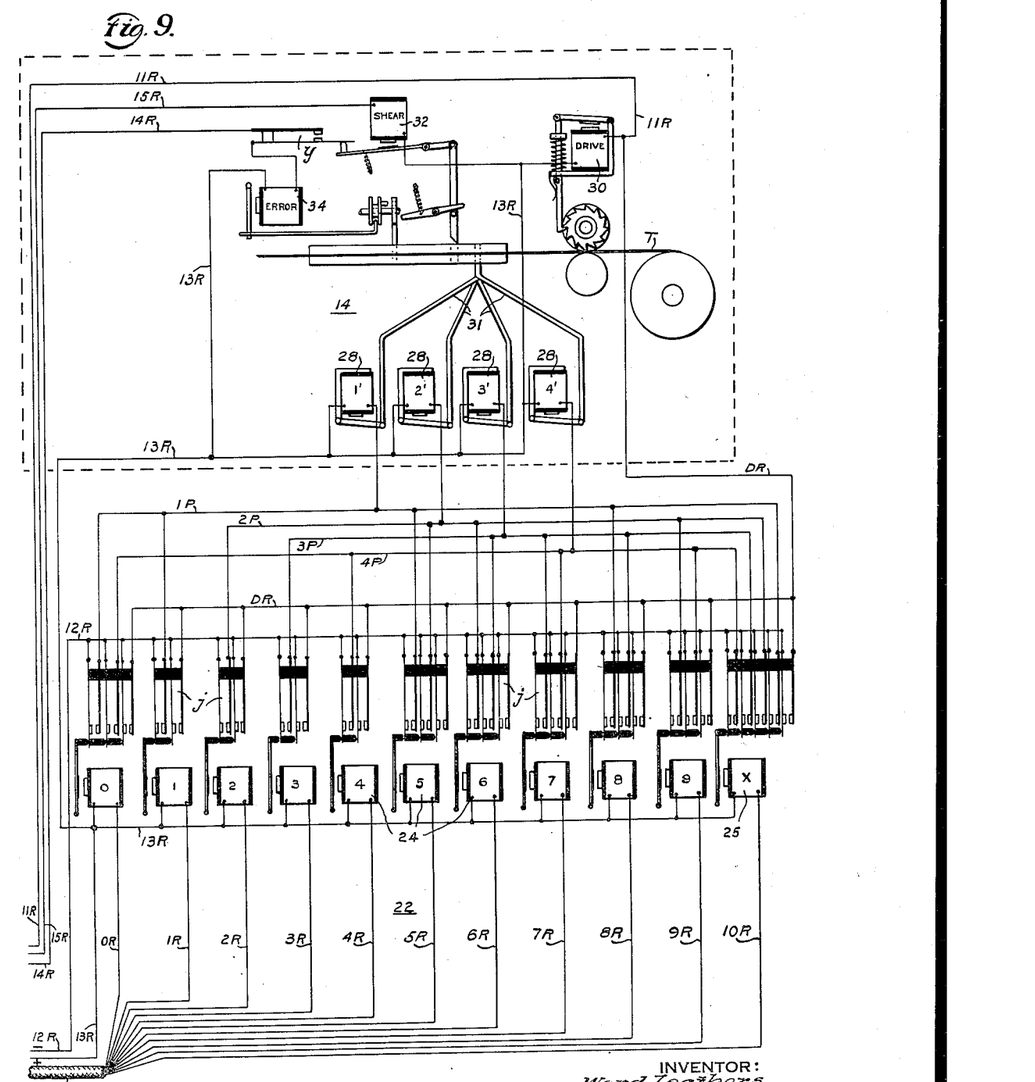
Fig. 9 is a diagrammatic view of the electrical connections for the card or token making perforator.

The card or token making device 14, which operates under the control of the indicating control device 10, does not, in itself, form a part of the present invention and no claim is made herein to any novelty associated with the same. Reference may be had to the above mentioned application of Ward Leathers for a full disclosure thereof. It is deemed sufficient for illustrative purposes herein to state that this device includes a coding device 22 comprising a series of coding magnets 24, labeled 0 to 9, inclusive, and a magnet 25 labeled X having the common line or connection 13R and having individual connections 0R to 10R, inclusive. The various coding magnets 24 serve to selectively control the opening and closing movements of a series of coding contacts *j* having a common connection 12R and four connections 1P to 4P, inclusive, leading to a series of four punch magnets 28 labeled 1' to 4', inclusive and forming a part of the perforating device 14. The magnets 28 are electrically connected in common to the line 13R and serve to operate respective punches, by means of which a billing data tape T or the like is successively perforated in the various fields and index point positions thereof. Certain of the contacts *j* are connected in common by a line DR to a drive magnet 30, labeled "Drive," included in the perforating device 14 and additional magnets 32 and 34, labeled "Shear" and "Error" respectively are electrically connected in common to the line 13R and have individual connections 15R and 14R respectively leading to the control device 10. The connection 11R is provided for the drive magnet 30.

As may be determined from an inspection of the above mentioned application of Ward Leathers, the drive magnet 30 operates upon each energization thereof to advance the billing data tape one position or step; the shear magnet 32 operates upon energization thereof to sever perforated portions of the tape T to provide individual cards or tokens; and the error magnet 34 operates to eject the erroneously perforated or otherwise unwanted severed cards or tokens from the perforating apparatus to a point of discard.

While any desired number of punch magnets 28 may be employed, in the present instance four such magnets have been shown simply because, for illustrative purposes, a four line code, such as is shown in the application of Ward Leathers, Serial No. 349,975, filed August 2, 1940, for Automatic meter reading apparatus, is employed for perforation of the billing data tape T.

Referring now to Figs. 5 and 7, the keyboard 12, by means of which the perforating device 14 is actuated through the indicating control device 10, includes a plurality of character keys 36 which are preferably ten in number to accommodate the ten digits of the Arabic system. These keys may be arranged on the box-like keyboard base 38 in a conventional manner as shown in Fig. 5 and are preferably labeled as shown in this figure. The keyboard also includes keys labeled "Space," "Special," "Tab," and "Error," respectively designated at 40, 42, 44 and 46. As shown in Fig. 6, the error key 46 partially overlies or overlaps the tabular key 44 in such a manner that the latter key 44 may be depressed individually, but the former key 46 may not be so depressed but must necessarily upon depression thereof depress or carry with it the tab key 44. The purpose of such overlapping of keys will become apparent presently.

Each of the keys 36, 40, 42 and 44 has associated therewith a micro-switch unit 48 (Fig. 7) and the keys are spring pressed by the internal mechanism of their various micro-switches in such a manner as to return to their normal elevated positions after being depressed. The various micro-switches include internal contact groups which, in the case of the ten character keys 36 include two pairs of normally open contacts, which in each instance are labeled *a* and *b*. The micro-switch of the special key 42 is provided with two pairs of normally open contacts labeled *c* and *d*, while the micro-switch of the space key 40 is provided with two pairs of normally open contacts labeled *e* and *f*. The micro-switch of the error key 46 has associated therewith a single pair of normally open contacts labeled *g* and the micro-switch of the tabular key 44 has associated therewith a pair of normally closed and a pair of normally open contacts, which contacts are labeled *h* and *i* respectively.

Figure 8:
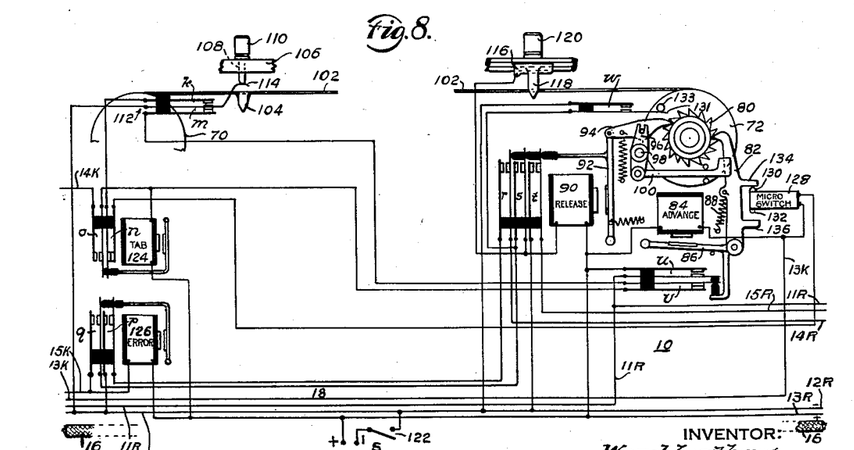
Fig. 8 is a diagrammatic view of the electrical connections for the indicating control device.

Placing sheets 1, 2 and 3 of the drawings in edge-to-edge relationship in such a manner that Figs. 7, 8 and 9 appear from left to right, a complete circuit diagram of the indicating control apparatus 10 and its control keyboard 12 and its controlled recording device 14 is obtained. It will be seen from this circuit diagram that the various lines 0R to 10R inclusive are directly connected through the cable 16 to one contact of each of the pairs of contacts *b*.

Referring now to Figs. 1, 2, 3 and 4, the indicating control apparatus 10 includes a box-like casing 47 having a bottom wall or base 50, a rear wall 52, a slightly forwardly sloping top wall 54, a sharply inclined panel wall 56, a front wall 58 and side walls 60. The panel wall 56 is provided with a glass covered window opening 62 behind which there is disposed a scale 64 and below which there is disposed a bracket 66 having outwardly turned edges forming therebetween a groove in which there is slidably received a field-indicating chart 68 having printed or otherwise marked thereon and suitably colored, if desired, various fields associated with a particular style or type of billing data material which it is desired to apply to the final billing data tape T. In the case of the production of individual cards or tokens from the tape T, the chart 68 represents or indicates the various fields which cooperate to make up a single card or token. Provision is made for a spacing field 67 at the extreme right-hand end of the chart and the positions in this field are employed, as will appear presently, to provide for blank spaces between adjacent accounts on a continuous tape or to produce a shearing margin when the tape is to be severed into cards or tokens.

Suitably carried within the casing 47 are a pair of drums 70 and 72 (Fig. 3), the drum 70 being mounted for rotation about the axis of a fixed shaft 74 and being biased or tensioned against rotation in a clockwise direction by means of a spring 76. The drum 72 is rotatably mounted on a shaft 78 and has associated therewith a ratchet wheel 80 which cooperates with a pawl 82 for driving purposes. The pawl 82 is of the presetting type and its movements are controlled under the influence of an advance magnet 84, labeled "Advance," and having an armature 86 connected to the pawl 82 and adapted upon energization of the magnet to be attracted to move the pawl to a preset condition. The armature is biased by means of a spring 88 to a normal position in such a manner that upon deenergization of the magnet the pawl performs its operative drum-advancing stroke.

A release magnet 90, labeled "Release," is provided with an armature 92 having a retaining pawl 94 connected thereto which normally engages the toothed periphery of the ratchet wheel 80 to prevent reverse movement of the drum 72. A link 96, which is pivoted for oscillation about an axis 98 is connected at one end to the retaining pawl 94 and at the other end to a thrust rod 100. The arrangement of the armature 92, pawl 94, link 96 and thrust rod 100 is such that upon energization of the magnet 90 the pawl 94 is withdrawn from the periphery of the ratchet wheel 80, while at the same time the thrust rod 100 engages the pawl 82 and renders the latter inoperative in order that the drum 72 may reverse its normal direction of movement under the influence of the spring 76.

A steel strip or band 102 (Figs. 3, 4 and 8) extends or bridges the distance between the two drums 70 and 72, has one end anchored to the periphery of the former drum and the other end anchored to the periphery of the latter drum. The drum 70 has a yielding torque applied thereto or, in other words, is biased or tensioned in a such a manner that the steel band 102 remains under tension and portions thereof may be progressively applied to the drum 72 as the ratchet and pawl mechanism 80, 82, is indexed and the band is unwound from the drum 70.

The steel band 102 carries an indicator or pointer 104 which overlies the scale 64 and is movable bodily with the band 102 from an initial position, wherein the pointer is in register with the zero mark of the scale, to a final position, wherein the pointer is in register with the last operative mark on the scale.

Positioned above the steel band 102 and substantially coextensive therewith throughout the straightaway portion of the same is a strip of insulating material 106, hereinafter referred to a tabular bar, and which is provided with adjacent rows of holes 108 arranged in staggered relationship. The holes 108 are adapted to selectively receive therein one or more tabular pins 110 (Fig. 8) which also are formed of insulating material and which project completely through the various holes 108 and extend downwardly a slight distance below the plane of the tabular bar 106. The lower ends of the pins 110 are designed to serve as cams for actuating a pile or group of contacts 112 associated with the steel band 102, as will become apparent presently.

Still referring to Fig. 8, the contact group 112 includes a pair of normally closed contacts $k$ and a pair or normally open contacts $m$. The contact group is affixed to and is bodily movable with the steel band 102. A follower 114 associated with the group 112 is adapted to bear upwardly against the tabular bar 106 and ride over the lower ends of the pins 110 as the tape is advanced from the drum 70 to the drum 72. When the follower 114 bears against the tabular bar 106 the pair of contacts $k$ remain closed and the pair of contacts $m$ remain open. When, however, the follower 114 moves into position in engagement with one of the pins 110, as for example, when it is in the position shown, the positions of these contacts are reversed.

When the follower 114 arrives at the end of its operative travel, it is designed to make electrical contact with a bar 116, hereinafter referred to as the finish bar, to complete an electrical circuit for purposes that will become clear hereinafter. The finish bar 116 is capable of being adjusted longitudinally of the tabular bar 106 and may assume positions underlying the various holes 108, depending upon the collective extent of the various fields in the billing data tape for each account or in the individual cards or tokens. An indicator or pointer 118 (Figs. 1 and 8) is associated with the finish bar 116 and overlies the scale 64 while a clamping screw 120 is provided for the purpose of securely clamping the finish bar in a selected position. It will be understood that the tabular bar 106 is accessible at the top wall 54 of the indicating control apparatus 10 for the purpose of adjustment of the finish bar and of insertion of the pins 110 in their selected holes 108.

It is the function of the tabular bar 106 and its selectively placed pins 110 to control the operation of the indicating control apparatus in much the same manner that the tabular stops on a typewriter control the tabular operation of the machine carriage. The pins 110 are placed in the particular hole corresponding to the index point positions existing on the billing data tape where the various fields are separated from the next adjacent fields. Additionally, a pin is permanently placed in the first hole appearing at the left-hand end of the tabular bar. This latter pin is essential to the proper operation of the apparatus. Thus, for example, if the first field appearing on the chart 68 of Fig. 1 contains three index point positions, a pin will be placed in the fourth hole for tabular purposes.

Referring now to Figs. 7, 8 and 9, the contacts $a$ of the various character keys 36, and the contacts $e$ of the space key 40, are connected in parallel and also in parallel with the pair of contacts $i$ of the tabular key 44 and closing of any one of them operates to energize the advance magnet 84. Power for this purpose is supplied from a source S which is connected through a switch 122 to the lines 12R and 13R representing the negative and positive power lines respectively for all three of the units 10, 12 and 14.

The manner in which the steel band 102 is periodically shifted in step-by-step fashion from the drum 70 to the drum 72 to advance the indicator or pointer 104 and contact group 112 during their operative indicating and circuit closing functions, and the manner in which the drum 72 is released and the tape allowed to become rewound on the tensioned drum 70 to bring the indicator and contact group to their initial or starting positions have previously been described. Such advancing and releasing operations are controlled under the influence of the advance and release magnets 84 and 90 respectively. Additional magnets employed in the control apparatus 10 include a tabular magnet 124, labeled "Tab", and an error magnet 126, labeled "Error." The tabular magnet 124 has associated therewith and operates to shift the positions of a pair of normally closed contacts $n$ and a pair of normally open contacts $o$. The error magnet 126 similarly controls the opening and closing movements of two pairs of normally open contacts $p$ and $q$. The release magnet 90 has associated therewith and controls the operation of three pairs of normally open contacts $r$, $s$ and $t$, while the advance magnet controls the operation of a pair of normally open contacts $u$ and a pair of normally closed contacts $v$.

Besides the electromagnetic relays controlled by the four magnets 84, 90, 124 and 126, the control apparatus 10 includes one additional instrumentality in the form of a micro-switch 128 (see Fig. 8) having oppositely disposed operating buttons 130 and 132 adapted to be alternately engaged by a pair of operating fingers 134 and 136 respectively carried on the pawl 82. The micro-switch has associated therewith internally a pair of contacts (not shown) and these contacts operate when the operating button 130 is engaged to become closed and when the operating button 132 is engaged to become open. The function of the various electromagnetic instrumentalities of the control apparatus 10 and of the microswitch 128 will now be fully set forth.

Assuming that the tension on the drum 70 is at a minimum and that the band 102 is in its extreme position wherein the indicator 104 is at the zero position of the scale 64 and the contact group 112 is in a position wherein the follower 114 rests upon the pin 110 which is permanently positioned in the first hole 108 of the tabular bar 106, the contacts $k$ will be open and the contacts $m$ will be closed. Upon closing of the switch 122, power is made available for operation of the three units 10, 12 and 14.

Inasmuch as the circuit for the tabular magnet 124 commences with the positive power line 13R and passes through the magnet itself, the normally closed pair of contacts $v$, the pair of contacts $m$ which are closed by the position of the follower 114 on the pins 110, and ends at the negative power line 12R, closure of the switch 122 causes immediate energization of the tabular magnet 124.

If, at the commencement of the perforating operations on the billing data tape T it is desired to perforate characters in the first field thereof, the operator at the keyboard 12 will actuate the latter in the usual manner and the keyboard will cause selective energization of the various circuits passing through the cable 16 and thus operate the coding device 22, which in turn will cause operation of the proper punch magnets 28 of the perforating device 14. During operation of the perforating device 14 the tape T will be advanced commensurately and the indicator 104 will also be moved accordingly.

If, however, at the commencement of the perforating operations it is desired to leave the first field on the billing data tape T unperforated and commence perforation of the second field, the operator will depress the tabular key 44 and the indicator 104 will advance in step-by-step fashion automatically the required number of positions (in this instance three spaces), while the tape T will also be advanced a commensurate number of positions. The manner in which the control operations just outlined take place will be set forth presently but, assuming that it is desired to perforate two characters in the first two positions of the first field of the tape T, the operator will commence operation of the apparatus by depressing the first desired character key 36. The special key 42 will hereinafter be included as a character key as its function is merely to perforate the tape T with a special character outside the range of the ten Arabic numerals. Such a character may be employed to designate insignificant zeros occurring in a field prior to perforation of significant code figures. Upon depression of the key 36 or the key 42, the contacts $a$ and $b$ associated therewith become closed. Closure of the contacts $a$ causes energization of the advance magnet 84, thus presetting the pawl 82. At the same time, one of the coding magnets 24 and, consequently, one or more of the perforating magnets 28 and the drive magnet 30 will be energized, thus punching the tape and providing for advancement thereof upon subsequent deenergization of the magnet 30. Upon release of the character key, the magnets 28, 30 and the advance magnet 84 become deenergized, thus withdrawing the punch or punches from the tape T, advancing the tape T and advancing the steel band 102 to move the indicator 104 and contact group 112 one position to the right, as viewed in Figs. 1 and 8.

Inasmuch as when the steel band 102 moves to the right, the follower 114 rides off of the lower end of the first permanently positioned tabular pin 110 and engages the underneath side of the tabular bar 106, the pair of contacts $k$ become closed and the pair of contacts $m$ become open. The tabular magnet 124, however, remains energized even though it is disposed in the circuit of the contacts $k$ by virtue of the locking effect of the pair of contacts $o$ which are in a circuit leading from the positive power line 13R to the negative power line 12R through the normally open pair of contacts $h$. Closure of the pair of contacts $k$ of the contact group 112 is without function at this time inasmuch as the pair of contacts $n$ remain closed.

The second character key 36 is next operated and, in a manner similar to that just described, the second character is punched in the first field of the tape T, while at the same time the indicator 104 and contact group 112 are advanced one position along the scale 64 and tabular bar 106 respectively.

Since it is not desired to perforate the tape T in the first field thereof further, by reason of the previously assumed conditions, the operator will now depress the tabular key 44 of the keyboard 12, thus closing the associated pair of contacts $i$ and opening the pair of contacts $h$. Closing of the contacts $i$, which are arranged in parallel with all of the contacts $a$ of the character keys 36, will cause energization of the advance magnet 84. Opening of the pair of contacts $h$ will cause deenergization of the tabular magnet 124 and, incidentally, opening of these latter contacts is the only manner in which the tabular magnet may become deenergized.

Upon release of the tabular key 44 the contacts $h$ again become closed and the contacts $i$ again become open. The tabular magnet 124, however, does not become energized at this time, inasmuch as the contacts $o$ have been opened by virtue of such deenergization of the magnet and inasmuch as the contacts $m$ and $v$, the latter being associated with the advance magnet 84, are also open. Upon reopening of the contacts $i$ the advance magnet 84, which is in the same circuit with these latter contacts, becomes deenergized, thus permitting the pawl 82 to move downwardly, as shown in Fig. 8, and perform its operative ratchet advancing stroke. The upper operating finger 134 will, upon movement of the pawl 82 downwardly, engage the operating button 130 and close the contacts (not shown) contained within the internal mechanism of the micro-switch 128. Upon closing of these contacts a circuit is established from the positive power line 13R through the advance magnet 84, through the microswitch 128, through the contacts $n$ and through the contacts $k$ of the group 112 to the negative power line 12R. The advance magnet 84 being thus energized, the pawl 82 moves upwardly. It is to be noted that the contacts of the microswitch 128 will remain closed, regardless of the release of the operating button 130 by the finger 134 until such time as the operating finger 136 engages the operating button 132. In this manner incomplete actuation of the micro-switch is prevented and full retracting and advancing strokes of the pawl 82 are assured.

Movement of the pawl 82 upwardly to its preset position causes the pair of contacts $u$ to become closed, thus energizing the drive magnet 30 of the perforating device 14. When the pawl 82 assumes its fully preset condition, the contacts of the micro-switch 128 become open to again deenergize the advance magnet 84. The pawl 82 will again move downwardly as previously described. Each time the pawl moves from its uppermost position to its lowermost position, the ratchet wheel 80 will be indexed and the steel band 102 advanced one position, thus carrying with it both the indicator 104 and contact group 112. Since the drive magnet 30 is periodically energized and deenergized during reciprocation of the pawl 82, the tape T in the perforating device 14 will be advanced in synchronism with the movements of the indicator 104 carried by the steel band 102.

This repetition of events will continue under the control of the micro-switch 128 until such time as the follower 114 rides downwardly onto the lower end of the second contact pin 110 which is positioned in one of the holes 108 in the tabular bar 106. When this occurs, the contacts $k$ will become open and the contacts $m$ will become closed. Opening of the former pair of contacts causes opening of the circuit of the micro-switch 128, thus rendering the latter inoperative. The contacts $m$, upon closure thereof, cause reenergization of the tabular magnet 124. Thus, the mechanism is restored to substantially the same condition it was at the commencement of operations, with the exception that the follower 114 and the indicator 104 assume respective positions for operative perforation of the second field of the tape T.

If it is not desired to leave the entire second field unperforated, or in other words, to skip this field, the operator will again depress the tabular key 44, thus opening the contacts $h$ and closing the contacts $i$ and essentially the same train of events just described will take place with the follower 114 and indicator 104 moving to the respective positions which they will occupy at the commencement of the perforation of the third field of the tape T and with the follower 114 resting upon the lower end of the third pin 110 in the tabular bar 106. It is to be noted at this point that the contacts $v$ of the advance magnet 84 are provided for the purpose of breaking the circuit through the tabular magnet 124 when the tabular key 44 is depressed. Regardless of the position of the contacts $m$ in the contact group 112, the contacts $i$ associated with the tabular key 44 serve to energize the advance magnet 84 and subsequently break the circuit through the contacts $v$.

From the above description it will be seen that the operator may perforate the tape T in any manner he desires from the keyboard 12, completely filling fields with perforations, skipping portions of the fields, or skipping entire fields, as desired.

As has previously been stated, when the steel band 102 approaches its final position, the indicator 104 will be somewhere near the right-hand end of the scale 64 and the follower 114 will approach the finish bar 116. This latter bar, as already noted, is adjustable along the scale 64 by means of the adjusting or clamping knob 120. When the operator is about to depress a character key 36 to create the last perforation in the last field of a card, token, tape or other record media, the follower 114 rests immediately adjacent the finish bar 116. Upon completion of the perforation of the last character in this field, the follower 114 will ride downwardly onto the lower end of the last pin 110 in the tabular bar 106 and remain there. Subsequent depression of the tabular key 44, in order to clear the machine and effect shearing of the card or token from the tape if required, causes the indicator 104 and contact group 112 to be repeatedly advanced until the follower 114 engages the finish bar 116 and effects electrical contact therewith. An electric circuit is thus completed leading from the negative power line 12R through the follower 114 and finish bar 116 to the release magnet 90 and from thence to the positive power line 13R. The release magnet 90 is thus energized and is maintained energized by virtue of closure of the locking contacts $s$ associated therewith. It is to be noted that the circuit through the locking contacts $s$ also extends through a normally closed pair of contacts $w$. These latter contacts $w$ have associated therewith a finger or projection 131 which projects into the path of movement of a pin 133 mounted on the drum 72 adjacent the periphery thereof. The contacts $w$ remain normally closed and are adapted to be opened by engagement of the finger 131 by the pin 133 when, and only when, the drum 72 is fully retracted and the steel band 102, together with its indicator 104 and contact group 112, are in their initial or starting positions. When the release magnet 90 becomes energized (see Figs. 3 and 8) the ratchet wheel 80 is released by the holding pawl 94 and the pawl 82 is moved completely out of engagement with the teeth of the ratchet wheel, as previously described. Thus, the tension of the drum 70 causes a rewinding or retraction of the steel band 102 until such time as the pin 133 engages the finger 131 and causes the contacts w to become open to thereby deenergize the release magnet and again lock the drum 72 in its initial position.

Upon energization of the release magnet 90, the pair of contacts t become closed, thus energizing the line 15R by means of which the shear magnet 32 (see Fig. 9) is energized to sever a completed card or token from the tape T in a manner clearly set forth in the above mentioned application of Ward Leathers. In an instance where the control apparatus 10 is employed to control the operation of a perforating device that makes no provision for severing cards or tokens from the roll of tape T, the line 15R is left open or, in other words, it is not connected through the Jones plug connection 20 to the recording device 14. It will be seen from the above description that where the control apparatus is employed to control a card or token forming machine, the shearing operation will automatically take place immediately upon arrival of the follower 114 at the finish bar 116.

In the event that in perforating a card or token the operator makes a mistake and is conscious of so doing, means are provided whereby he may, by operation of the keyboard 12 (see Figs. 5 and 7) cause ejection of the erroneous card or token from the machine. Regardless of the particular position of the indicator 104 at the time the error is encountered, in order to eject the erroneously perforated token, the operator merely depresses the error key 46, thus causing the tabular key 44 to be simultaneously depressed. As previously described, depression of the tabular key operates through the medium of the micro-switch 128 to cause continuous tabulation until such time as the follower 114 rides downwardly on the next pin 110. Subsequent depression of either the error key 46 or the tabular key 44 will carry the follower 114 to the next pin 110. The operation is repeated using either key until such time as the follower engages the finish bar 116. Upon depression of the error key 46, the contacts g become closed in addition to the opening of the contacts h and closing of the contacts i. Closure of the contacts g serves to energize a line 15K and cause energization of the error magnet 126 (see Fig. 8). This latter magnet when energized effects closure of the contacts q which constitute locking contacts for the magnet and which shunt this magnet across the negative and positive power lines 12R and 13R respectively. It is to be noted, however, that the locking contacts q are in series with the contacts w, whose operation is controlled by rotation of the drum 72. Thus the error magnet 126 when once energized will remain energized until such time as the contacts w become open. The contacts p, controlled by the error magnet 126, also become closed and upon closing thereof a circuit is completed from the negative power line 12R through these contacts and through the pair of contacts r of the release magnet 90 to the line 14R leading to the error magnet 34 in the perforating device 14. This line 14R becomes potentially energized only when both pairs of contacts p and r are closed and therefore upon contact with the follower 114 with the finish bar 116 the release magnet 90 is energized in the manner previously set forth. The resulting action is identical with the return action of the steel band 102, as previously described, except for the fact that energization of the release magnet 90 is this time accomplished with the application of a potential across the line 14R and the positive power line 15R. In the event that the control unit 10 is employed to control the operation of a perforator that makes no provision for severing cards or tokens from the tape T, the line 14R is not connected to the recorder 14 and remains inoperative. If the unit is used to control a card or token forming device, the line 14R is directly connected to the error magnet 34 and causes energization thereof when both pairs of contacts r and p are closed. The error magnet 34 is employed for the purpose of operating card or token ejecting instrumentalities which have not been disclosed in this application but which will be fully understood by reference to the above mentioned application of Ward Leathers.

In certain types of card or token forming machines during normal operation thereof, the error magnet 34 is adapted to become energized a fraction of a second after energization of the shear magnet 32 has taken place, while in other types of machines these two magnets are designed for simultaneous energization. In instances where the error magnet is energized subsequent to energizing of the shear magnet, it is necessary to interpose in the line 14R leading to the error magnet a pair of contacts y which normally remain open but which are adapted to become closed under the influence of the shear magnet 32.

Upon deenergization of the error magnet 34, by virtue of opening of the contacts r associated with the release magnet, the token which previously had been erroneously perforated and which, therefore, is unwanted, is ejected from the machine. By virtue of depression of the tabular key 44 along with the error key 46, the machine is normally restored to its original starting position and the same stands in readiness for commencement of the perforation of a new token.

It is to be noted that the finish bar 116 is adjustable longitudinally of the tabular bar 106, and thus when this finish bar is adjusted the number of index point positions additively contained in all of the various fields to be perforated is determined by the number of holes contained in the tabular bar and existing at the left side of the pin 110 nearest the finish bar 116. The holes existing in the tabular bar between this last pin 110 and the finish bar itself determine the number of unperforated spaced or index point positions required to distinguish between successive accounts or data on the tape when shearing operations are not resorted to.

In the operation of the apparatus as described thus far herein, the operator must utilize the space key 40 of the keyboard 12 to advance the indicator 104 and tape without perforating the latter the required number of spaces or positions at the beginning of each field in order that significant figure perforations will fall in the correct index point positions with respect to the decimal point. For example, if a particular field contains five index point positions and will thus accommodate a maximum money figure of $999.99 and the actual figure to be perforated is only $2.37, the operator is obliged to commence operations in this field by advancing the indicator and tape two positions before perforation commences or he is obliged to commence operations by perforating the tape twice with a special character.

When this is done the figures "2," "3" and "7" will fall in their proper positions with respect to the decimal point and the perforated field will indicate $2.37.

The present invention is designed to eliminate the necessity for using special characters or for resorting to repeated spacing of the tape, thus relieving the operator of considerable responsibility. By the simple expedient of perforating the data in each field in reverse order, perforation in that field will terminate immediately prior to one or more insignificant zeros and the operator may then dismiss the field by the use of the tabular key. Thus, where $2.37 is to be perforated in a field containing five index point positions, operations in that field will commence by perforating 73.2 in the tape. The remaining two insignificant zeros in the field may be dispensed with by depression of the tabular key and the indicator and tape will move to the next field. The operator is thus relieved of the burden of counting the number of blank spaces to be effected by means of the space key. The fact that the perforated data will be in reverse order presents no problem since rectification therefor may readily be made by suitable well-known plugging-in operations in the recording apparatus, whatever it may be.

It is thought that from the above description the character and operation of the herein described indicating control device will be readily apparent. The invention is not to be limited to the exact arrangement of parts shown in the accompanying drawings or described in this specification as various changes in the details of construction may be resorted to without departing from the spirit of the invention. Only insofar as the invention has been particularly pointed out in the accompanying claims is the same to be limited.

What is claimed is:

1. In a keyboard-controlled mechanism for selectively closing a plurality of electrical output circuits leading to the operating magnets of a card perforating and forming machine for forming individual cards from a continuous strip of tape and having a tape-advancing magnet, a shear magnet and a card ejecting magnet, an indicating scale representative of the various card fields and index point positions within said fields to be perforated in the cards by said perforating and forming machine, a movable indicator for said indicating scale movable therealong from an initial position at one end of the scale to a final position at the other end thereof, means under the control of the keyboard for advancing said indicator along the scale in step-by-step fashion, means operable under the control of said indicator-advancing means for periodically closing the output circuit leading to said tape-advancing magnet to advance the tape and indicator in synchronism, and means operable when the indicator has been advanced to its final position adjacent said other end of the scale for returning the same to its initial position and for substantially simultaneously closing the output circuit leading to said shear magnet.

2. In a keyboard-controlled mechanism for selectively closing a plurality of electrical output circuits leading to the operating magnets of a card perforating and forming machine for forming individual cards from a continuous strip of tape and having a tape-advancing magnet, a shear magnet and a card ejecting magnet, an indicating scale representative of the various card fields and index point positions within said fields to be perforated in the cards by said perforating and forming machine, a movable indicator for said indicating scale movable therealong from an initial position at one end of the scale to a final position at the other end thereof, means under the control of the keyboard for advancing said indicator along the scale in step-by-step fashion, means operable under the control of said indicator-advancing means for periodically closing the output circuit leading to said tape-advancing magnet to advance the tape and indicator in synchronism, and means operable when the indicator has been advanced to its final position adjacent said other end of the scale for returning the same to its initial position and for substantially simultaneously closing the output circuit leading to said shear magnet and the output circuit leading to said card-ejecting magnet.

3. In a keyboard-controlled mechanism for selectively closing a plurality of electrical output circuits leading to the operating magnets of a card-perforating and forming machine for forming individual cards from a continuous strip of tape and having perforating magnets, a tape-advancing magnet and a shear magnet, an indicating scale representative of the various card fields and index point positions within said fields to be perforated in the cards by said perforating and forming machine, a movable indicator for said scale and movable therealong, means operable under the control of said keyboard for selectively closing the output circuits leading to said perforating magnets and for advancing said indicator along said scale in step-by-step fashion, means also under the control of said keyboard for automatically repeatedly advancing said indicator along said scale while simultaneously opening the circuits leading to said perforating magnets, and means operable under the control of both said indicator-advancing means for periodically closing the circuit leading to said tape-advancing magnet to advance the tape and indicator in synchronism.

4. In a keyboard-controlled mechanism for selectively closing a plurality of electrical output circuits leading to the operating magnets of a card perforating and forming machine for forming individual cards from a continuous strip of tape and having a tape-advancing magnet, a shear magnet, an indicating scale representative of the various card fields and index point positions within said fields to be perforated in the cards by said perforating and forming machine, a movable indicator for said scale movable therealong from an initial position to a final position, means operable under the control of the keyboard for advancing said indicator along the scale in step-by-step fashion, means operable under the control of said indicator-advancing means for periodically closing the output circuit leading to said tape-advancing magnet to advance the tape and indicator in synchronism, and means operable when said indicator reaches its final position to close the circuit leading to said shearing magnet and to return said indicator to its initial position.

5. In a keyboard-controlled mechanism for selectively closing a plurality of electrical output circuits leading to the operating magnets of a card-perforating and forming machine for forming individual cards from a continuous strip of tape and having tape-perforating magnets, a tape-advancing magnet and a shear magnet, an indicating scale representative of the various card fields and index point positions within said fields to be perforated in the cards by said perforating and forming machine, a movable indicator for said scale and movable therealong from an initial position at one end of the scale to a final position at the other end thereof, means operable under the control of said keyboard for selectively closing the output circuits leading to said perforating magnets and for advancing said indicator along said scale in step-by-step fashion, means also under the control of said keyboard for automatically repeatedly advancing said indicator along said scale while simultaneously opening the circuits leading to said perforating magnets, means operable under the control of both said indicator-advancing means for periodically closing the circuit to said tape-advancing magnet to advance the tape and indicator in synchronism, and means operable when said indicator reaches its final position to close the circuit leading to said shearing magnet and to return said indicator to its initial position.

6. In a keyboard-controlled mechanism for selectively closing a plurality of electrical output circuits leading to the operating magnets of a card-perforating and forming machine for forming individual cards from a continuous strip of tape and having tape-perforating magnets, a tape-advancing magnet, a shear magnet and a card ejecting magnet, an indicating scale representative of the various card fields and index point positions within said fields to be perforated in the cards by said perforating and forming machine, a movable indicator for said scale and movable therealong from an initial position at one end of the scale to a final position at the other end thereof, means operable under the control of said keyboard for selectively closing the output circuits leading to said perforating magnets and for advancing said indicator along said scale in step-by-step fashion, means also under the control of said keyboard for automatically repeatedly advancing said indicator along said scale while simultaneously opening the circuits leading to said perforating magnets, means operable under the control of both said indicator-advancing means for periodically closing the circuit to the said tape-advancing magnet to advance the tape and indicator in synchronism, means operable when said indicator reaches its final position to close the circuit leading to said shearing magnet and to return said indicator to its initial position and also to close the circuit leading to said card-ejecting magnet.

7. In an indicating control device of the character described, an indicating scale, a pair of spaced drums mounted for rotation about respective horizontal axes, a supporting band having its opposite ends secured to said drums and bridging the distance therebetween, an indicator for said scale carried by said band, means yieldingly applying a torque to one of said drums in a direction to cause the band normally to be wound thereon, a ratchet and pawl mechanism for periodically indexing the other drum to wind the band thereon in step-by-step fashion against the yielding action of the first mentioned drum, said band being movable from an initial position wherein the indicator carried thereby is in a position at one end of said scale to a final position wherein the indicator is in a position at the other end of the scale, and a magnet for actuating said ratchet and pawl mechanism.

8. In an indicating control device of the character described, an indicating scale, a pair of spaced drums mounted for rotation about respective horizontal axes, a supporting band having its opposite ends secured to said drums and bridging the distance therebetween, an indicator for said scale carried by said band, means yieldingly applying a torque to one of said drums in a direction to cause the band normally to be wound thereon, a ratchet wheel carried by the other drum, an operating pawl for said ratchet wheel operable to periodically index said latter drum to wind the band thereon in step-by-step fashion against the yielding action of the first mentioned drum, a holding pawl for said ratchet wheel, said band being movable from an initial position wherein the indicator carried thereby is in a position adjacent one end of said scale to a final position wherein the indicator is in a position adjacent the other end of the scale, an advance magnet operable upon energization thereof to move the pawl to a preset position and upon deenergization to cause the pawl to perform its operative indexing stroke, a release magnet operable upon energization thereof to render said operating and holding pawls inoperative, and electrical circuits for said magnets.

9. In an indicating control device of the character described, an indicating scale, a pair of spaced drums mounted for rotation about respective horizontal axes, a supporting band having its opposite ends secured to said drums and bridging the distance therebetween, an indicator for said scale carried by said band, means yieldingly applying a torque to one of said drums in a direction to cause the band normally to be wound thereon, a ratchet wheel carried by the other drum, an operating pawl for said ratchet wheel operable to periodically index said latter drum to wind the band thereon in step-by-step fashion against the yielding action of said first mentioned drum, a holding pawl for said ratchet wheel normally in engagement with the same, said band being movable from an initial position wherein the indicator carried thereby is in a position at one end of the scale to a final position wherein the indicator is in a position at the other end of the scale, an advance magnet for actuating said operating pawl, a release magnet for withdrawing said holding pawl from engagement with said ratchet wheel, and electrical circuits for said magnets.

10. In an indicating control device of the character described, an indicating scale, a pair of spaced drums mounted for rotation about respective horizontal axes, a supporting band having its opposite ends secured to said drums and bridging the distance therebetween, an indicator for said scale carried by said band, means yieldingly applying a torque to one of said drums in a direction to cause the band normally to be wound thereon, a ratchet wheel carried by the other drum, an operating pawl for said ratchet wheel operable to periodically index said latter drum to wind the band thereon in step-by-step fashion against the yielding action of the first mentioned drum, a holding pawl for said ratchet wheel, said band being movable from an initial position wherein the indicator carried thereby is in a position adjacent one end of said scale to a final position wherein the indicator is in a position adjacent the other end of the scale, an advance magnet operable upon energization thereof to move the pawl to a preset position and upon deenergization to cause the pawl to perform its operative indexing stroke, a release magnet operable upon energization thereof to render said operating and holding pawls inoperative, an electrical circuit for said release magnet including a stationary contact adjacent said other end of the scale and a movable contact carried by the indicator and designed for engagement with the stationary contact when the indicator reaches its final position, and an electrical circuit for said advance magnet.

11. In an indicating control device of the character described, an indicating scale, a pair of spaced drums mounted for rotation about respective horizontal axes, a supporting band having its opposite ends secured to said drums and bridging the distance therebetween, an indicator for said scale carried by said band, means yieldingly applying a torque to one of said drums in a direction to cause the band normally to be wound thereon, a ratchet wheel carried by the other drum, an operating pawl for said ratchet wheel operable to periodically index said latter drum to wind the band thereon in step-by-step fashion against the yielding action of the first mentioned drum, a holding pawl for said ratchet wheel, said band being movable from an initial position wherein the indicator carried thereby is in a position adjacent one end of said scale to a final position wherein the indicator is in a position adjacent the other end of the scale, an advance magnet operable upon energization thereof to move the pawl to a preset position and upon deenergization to cause the pawl to perform its operative indexing stroke, a release magnet operable upon energization thereof to render said operating and holding pawls inoperative, an electrical circuit for said release magnet including a stationary contact adjacent said other end of the scale and a movable contact carried by the indicator and designed for engagement with the stationary contact when the indicator reaches its final position, said circuit also including a pair of normally closed contacts, means carried by said other drum for opening said latter pair of contacts when the indicator assumes it initial position, and an electrical circuit for said advance magnet.

12. In a control mechanism for record media perforating machines, an indicating scale representative of the various fields and index point positions within said fields to be perforated in a record media, a movable indicator adjacent said scale and movable therealong in step-by-step fashion, an advance magnet having an armature operable upon energization of the magnet to move to a preset condition and upon deenergization thereof to advance said indicator one step, a normally open circuit for said magnet, a normally open auxiliary circuit therefor, a manually operated circuit maker and breaker operable to close said first mentioned circuit and thereafter open the same to cause energization and deenergization of said magnet respectively, means operable upon deenergization of said magnet for closing said auxiliary circuit and upon energization thereof for opening said latter circuit, means normally rendering said auxiliary circuit ineffective, and a second manually operable circuit maker and breaker operable to initially energize said magnet and thereafter render said auxiliary circuit effective and also to open said first mentioned circuit.

WARD LEATHERS.
WILLIAM J. A. BAILEY.